United States Patent Office 3,452,000
Patented June 24, 1969

---

3,452,000
2-AZETIDINONES
Emilio Testa, Vacallo, Tessin, Switzerland, and Luigi Fontanella, Milan, Italy, assignors to Lepetit S.p.A., Milan, Italy
No Drawing. Filed Mar. 28, 1966, Ser. No. 537,717
Claims priority, application Great Britain, Apr. 26, 1965, 17,506/65
Int. Cl. C07d 25/00
U.S. Cl. 260—239      2 Claims

ABSTRACT OF THE DISCLOSURE

The invention is concerned with a novel class of compounds having sedative and tranquilizing activity. More particularly, the compounds are 1,3,3-trisubstituted 2-azetidinones, and are prepared by reacting the corresponding 1-unsubstituted azetidinones with trioxymethylene. The obtained 3,3-disubstituted-1-hydroxymethyl-2-azetidinone is then optionally converted into the acyl derivative through conventional procedures.

---

This application is concerned with 2-azetidinones. More particularly, the compounds with which this application is concerned are 3,3-disubstituted 2-azetidinones of the general formula

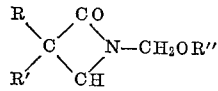

wherein R and R' represent a propyl, phenyl or ethyl group and R" is hydrogen or an aliphatic or aromatic carboxylic acid acyl radical.

The compounds of the invention show a high degree of tranquilizing activity, which is particularly evident for some members of the group.

The sedative effect of some compounds of this invention was evaluated through the abolishment of the righting reflex in mice, according to the procedure described in Il Farmaco, Sci. Ed., 14, 101 (1959). The dose effective in abolishing the righting reflex in 50 percent of the treated mice is recorded in the following table, together with the acute toxicity and the therapeutic index, as compared with Na 5-phenyl-5-ethylbarbiturate.

| Compound of example: | $ED_{50}$, mg./kg. | $LD_{50}$, mg./kg. | $LD_{50}/ED_{50}$ |
|---|---|---|---|
| 1 | 100 | 319 | 3.2 |
| 2 | 150 | 500 | 3.3 |
| 3 | 150 | 500 | 3.3 |
| 4 | 200 | 400 | 2.0 |
| 5 | 500 | >1,000 | >2.0 |
| 6 | 500 | >1,000 | >2.0 |
| 7 | 800 | 1,000 | 1.25 |
| 8 | 150 | 500 | 3.3 |
| 9 | 500 | >1,000 | >2.0 |
| 10 | 500 | >1,000 | >2.0 |
| 11 | 500 | >1,000 | >2.0 |
| Na 5-phenyl-5-ethylbarbiturate | 70 | 200 | 2.8 |

Also the anticonvulsant activity of the compounds of this invention was found to be very high. The compounds were injected intraperitoneally in decreasing dosages to groups of 5 to 10 mice. The animals were then subjected to electro-shock, 30, 90 and 180 minutes after the administration. Taking into consideration the percentage of animals protected by each dose of a product, the 50 percent protective dose ($PD_{50}$) was calculated from the highest observed effect, independently of the time elapsed from administration. Na 5-phenyl-5-ethylbarbiturate was also tested for purpose of comparison.

The following table gives the obtained results.

| Compound of example: | $PD_{50}$, mg./kg. | $LD_{50}/PD_{50}$ |
|---|---|---|
| 1 | 25 | 15.9 |
| 3 | 50 | 10.0 |
| 6 | 100 | >10.0 |
| 8 | 60 | 8.3 |
| Na 5-phenyl-5-ethyl-barbiturate | 25 | 8.0 |

The preparation of the new compounds starts from a 3,3-disubstituted, 1-unsaturated 2-azetidinone which is refluxed with an excess over an equimolecular amount of trioxymethylene in a water-lower alkanol mixture at a pH above about 8. The obtained 3,3-disubstituted N-hydroxymethyl-2-azetidinone is then converted, if desired, into the acyl derivative through known procedures, e.g. by treatment with a carboxylic acid chloride or anhydride.

The following are examples of preparation of the new derivatives.

EXAMPLE 1

1-hydroxymethyl-3,3-dipropyl-2-azetidinone

A solution of 90 g. of 3,3-dipropyl-2-azetidinone, 36 g. of trioxymethylene, 10 ml. of aqueous 10% sodium hydroxide and 800 ml. of ethanol is refluxed for 3 hours. After evaporation to dryness the residue is dissolved in diethyl ether, filtered, washed with water and evaporated to dryness. The residue is distilled collecting at 120–130° C./0.8 mm. Hg. Yield 82 g. (76%).

EXAMPLE 2

1-hydroxymethyl-3-phenyl-3-ethyl-2-azetidinone

A solution of 50 g. of 3-phenyl-3-ethyl-2-azetidinone, 24 g. of trioxymethylene, 7 ml. of aqueous 10% NaOH and 600 ml. of ethanol is refluxed for 4 hours. The mixture is concentrated to dryness, the residue is dissolved in diethyl ether, filtered and evaporated to dryness. The residual oil is distilled collecting at 160-170° C./0.8 mm. Hg. Yield 42 g. (72%).

EXAMPLE 3

1-propionoxymethyl-3,3-dipropyl-2-azetidinone

To a solution of 185 g. of 1-hydroxymethyl-3,3-dipropyl-2-azetidinone, 1800 ml. of diethyl ether and 360 g. of triethylamine a solution of 106 g. of propionyl chloride in 2000 ml. of diethyl ether is gradually added with external cooling. At the end of the addition the mixture is refluxed for 2 hours, cooled, filtered, the filtrate is washed with dilute hydrochloric acid and evaporated to dryness. The residue is distilled collecting at 110–115° C./0.5 mm. Hg. Yield 210 g. (87%).

EXAMPLES 4 TO 11

By the same procedure as described in Example 3 the following 1-acylated 2-azetidinones were prepared

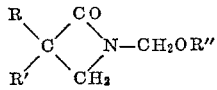

| | R | R' | R" | B.P.° C./mm. Hg or M.P.° C. | Yield |
|---|---|---|---|---|---|
| Example: | | | | | |
| 4 | $C_3H_7$ | $C_3H_7$ | $COCH_2Cl$ | 120-130/0.4 | 58 |
| 5 | $C_3H_7$ | $C_3H_7$ | $COC_6H_5$ | 155-160/0.5 | 73 |
| 6 | $C_3H_7$ | $C_3H_7$ | $COC_6H_4Cl=4$ | Decomp. on distillation | 54 |
| 7 | $C_3H_7$ | $C_3H_7$ | $COC_6H_2(OCH_3)=3,4,5$ | 65-67 | 75 |
| 8 | $C_6H_5$ | $C_2H_5$ | $COC_2H_5$ | 135-140/0.5 | 74 |
| 9 | $C_6H_5$ | $C_2H_5$ | $COC_2H_5$ | 73-74 | 63 |
| 10 | $C_6H_5$ | $C_2H_5$ | $COC_6H_4Cl=4$ | 180-185/0.2 | 74 |
| 11 | $C_6H_5$ | $C_2H_5$ | $COC_6H_2(OCH_3)_3=3,4,5$ | Decomp. on distillation | 76 |

We claim:
1. A compound of the formula

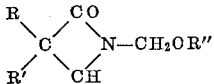

wherein R and R' are members of the class consisting of hydrogen, ethyl, propyl and phenyl, R" is a member of the class consisting of hydrogen, lower alkanoyl of 1 to 4 carbon atoms, chloroacetyl, benzoyl, 4-chlorobenzoyl, and 3,4,5-trimethoxybenzoyl.

2. 2-hydroxymethyl-3,3-dipropyl-2-azetidinone.

References Cited

UNITED STATES PATENTS 3,028,378  4/1962  Testa et al. _____ 260—239

OTHER REFERENCES

Houben-Weyl, Methoden der Organischen Chemie, Vierte Au Flage, vol. 11/2, (Stuttgart, 1958), p. 570.

ALTON D. ROLLINS, *Primary Examiner.*

U.S. Cl. X.R.

260—999